United States Patent [19]

Yamashita

[11] Patent Number: 5,012,745
[45] Date of Patent: May 7, 1991

[54] VEHICLE TURN-TABLE

[75] Inventor: Kyoichi Yamashita, Kanagawa, Japan

[73] Assignee: Koyo Jidoki Company Limited, Yokohama, Japan

[21] Appl. No.: 462,176

[22] Filed: Jan. 8, 1990

[30] Foreign Application Priority Data

Mar. 8, 1989 [JP] Japan .................... 1-53900

[51] Int. Cl.⁵ .............................. B60S 13/02
[52] U.S. Cl. .......................... 104/44; 104/38
[58] Field of Search ............ 104/38, 40, 41, 42, 104/43, 44, 99

[56] References Cited

U.S. PATENT DOCUMENTS

| | | | |
|---|---|---|---|
| 1,819,017 | 8/1931 | Drake | 104/38 |
| 1,881,033 | 10/1932 | Smith | 104/44 |
| 2,924,389 | 2/1960 | Anderson | 104/44 |
| 4,172,422 | 10/1979 | McBride | 104/38 |
| 4,753,173 | 6/1988 | James | 104/44 |

Primary Examiner—Robert J. Oberleitner
Assistant Examiner—S. Joseph Morano
Attorney, Agent, or Firm—Armstrong, Nikaido, Marmelstein, Kubovcik & Murray

[57] ABSTRACT

A vehicle turn-table (10) comprises a detector (60), which has a device for calculating the position of a vehicle to be driven accurately onto a table (30), and a turning table (30) which turns in response to the calculating device of the detector. A pair of movable belts (40, 41) are provided on the table to lead the front (A, A') and the rear wheels (B, B') of the vehicle to the table, and if, when the front wheels of the vehicle are on the detector, the vehicle is out of position, the calculating device calculates a center point of the vehicle, and then computes the turning direction and range of the table from the center point. The table (30) is then caused to rotate until the wheels of the vehicle and the belts are in alignment.

1 Claim, 6 Drawing Sheets

1

VEHICLE TURN-TABLE

BACKGROUND OF THE INVENTION

1. Field of the Invention

The present invention relates to a vehicle turn-table for a parking garage and, more particularly, to a vehicle turn-table enable even a driver with poor driving skill to lead a vehicle to the right position on a table.

2. Description of the Prior Art

In general, a turn-table provided at an entrance and exit of a parking garage comprises a rotatable circular table on which lines may be drawn or tracks may be made to fix the course along which a vehicle is to be driven forward to the right position to turn. The table turns its direction after the vehicle is completely driven onto the table.

However, it is often difficult for drivers to accurately follow these guide lines or tracks when the turn-table is in a parking garage, for instance, where the lighting is generally poor, and when the drivers have limited driving experience and skill.

Also in these cases, the body of the vehicle on the table is liable to contact a wall around the turn-table, thus causing accidents, due to the car being incorrectly positioned to turn. Furthermore, when the car is driven through the tracks, friction often arises between the rubber tires and the side of the tracks, causing wear to the tires.

OBJECT OF INVENTION

An object of the invention is to provide a turn-table which is easier to use by drivers of all experience and skill levels.

DETAILED DESCRIPTION OF INVENTION

Figure 1:
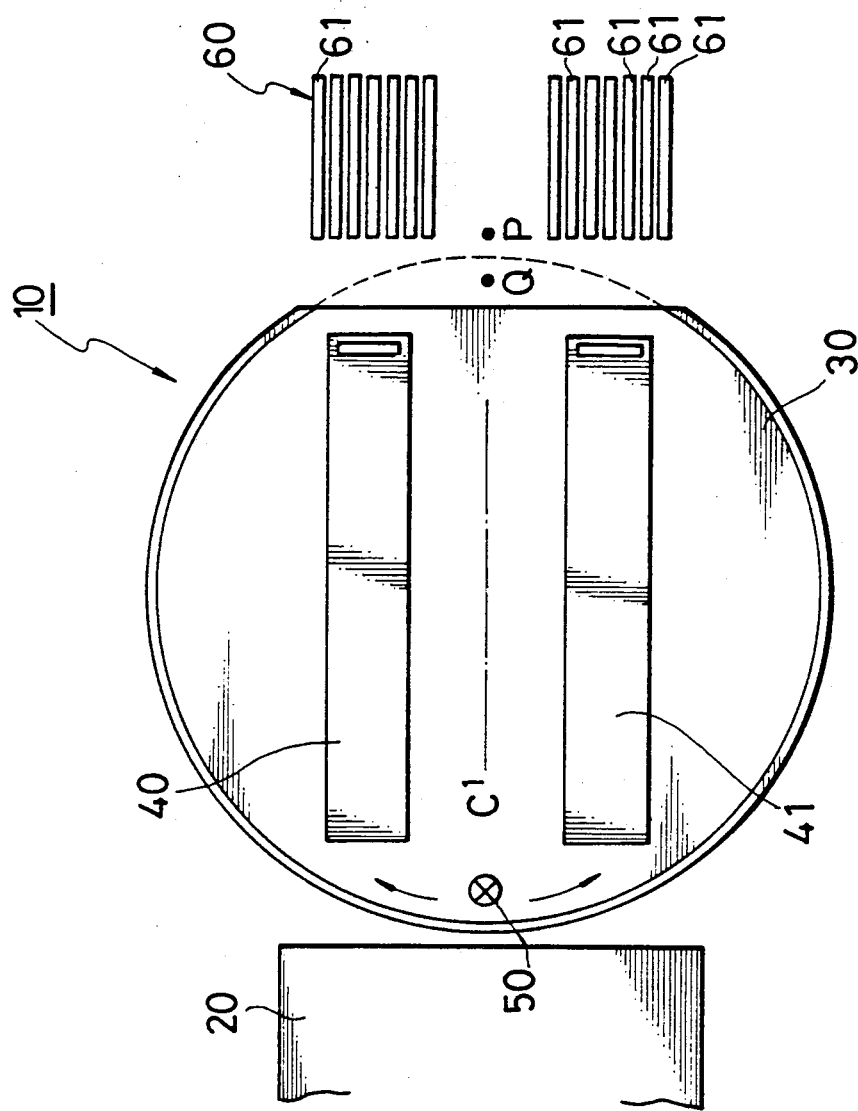
FIG. 1 is a plan view of an improved turn-table according to the invention.
Figure 2:
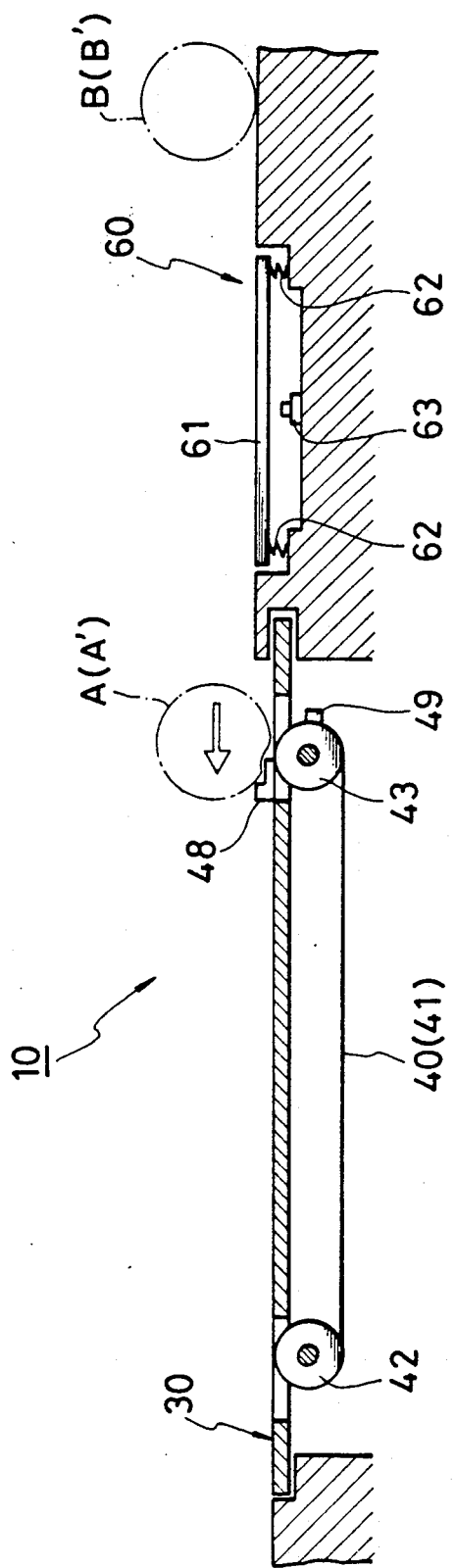
FIG. 2 is a sectional view of the table when the front wheels of the vehicle are on the table.

As shown in FIGS. 1 and 2, an entrance and exit 20 of the parking garage is provided near a turn-table 10, which comprises a table 30 capable of pivoting on a central vertical axis, a pair of belts 40 and 41 on the surface of the table 30, a sensor 50 which may be provided on the table or the ceiling to fix the stopping position of the vehicle, and a detector 60 which is provided near the table 30.

The table 30 of the invention is responsive to the detector 60 to align a center line C1 of the table 30 and a center line of the vehicle before the vehicle is driven onto the table 30. The table 30 is also responsive to the sensor 50 for guiding a vehicle of any type in accurately reaching a stopping position on the table 30.

The belts 40 and 41 may be rubber belts, or chain-like belts composed of plates connected to one another with hinge pins. The belts are driven by respective sprocket wheels 42 and are entrained around idler sprocket wheels 43.

Figure 3:
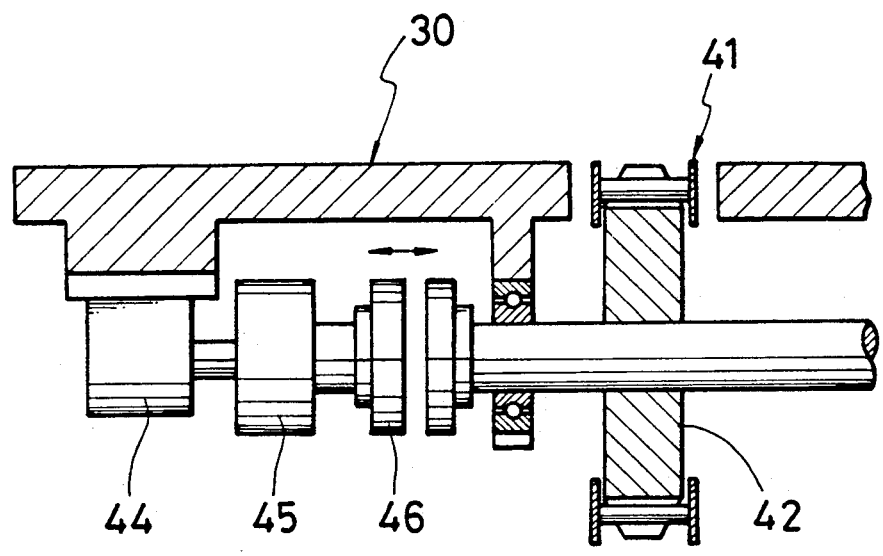
FIG. 3 is a fragmentary sectional view of the motor mechanism for driving the movable belts.

As shown in FIG. 3, a motor 44 with a speed-reducing gearbox 45 is to be connected to the belts 40 and 41 to rotate the belts 40 and 41 by engagement of an electromagnetic clutch 46 and released by disengagement of the electromagnetic clutch 46.

The electromagnetic clutch 46 is kept disengaged for free rotation of the belts until the front wheels of a vehicle have been completely driven onto the belts on the table 30. Thereafter, the belts 40 and 41 are forced to rotate by the motor 44 to pull the car fully onto the belts on the table.

As shown in FIG. 2, front stoppers 48 and rear stoppers 49 are provided on the belts 40 and 41 to fix the front wheels A and A' temporarily.

The detector 60 calculates the center point between the front wheels or the rear wheels, and controls the turning adjustment of the table 30 into alignment with the vehicle.

As shown in FIGS. 1 and 2, the detector 60 comprises foot-boards 61 which are provided substantially parallel to the course along with the direction in which the vehicle is driven, springy parts 62 which support each foot-board 61, and limit switches 63 which detect whether each foot-board 61 is pressed or not by the wheels by contact with the pressed foot-boards 61.

Two recesses are provided in front of the table 30, and the limit switches 63 are provided equally spaced on the bottom of their respective recesses. The springy parts 62 are provided before and behind each limit switch 63 at the bottoms of the recesses and the foot-boards 61 are supported on the respective springy parts 62.

Taking account of strength and efficiency of the foot-board 61, it is desirable that the pitch between the foot-boards 61 should be about 20 mm and the full length of the foot-boards 61 should be about 1500 to 2000 mm and should not extend over the full length between the front wheels and rear wheels of the vehicle.

The springy parts 62 are designed to be sufficiently elastic to raise a depressed foot-boards after the vehicle has moved off.

As shown, the foot-boards 61 are provided in the two separate recesses and each recess must be wider than the tread of each front wheel of the vehicle, however large the spacing between the left and right wheels of the vehicle. The foot-board could alternatively be provided in one place. In such case, the recess must be wider than the spacing between the front wheels.

With regard to the detector 60, a computer can be connected to each limit switch and to the running gear of the table 30 to calculate the vehicle center point P from the reactions of the pressed innermost or the outermost limit switches 63. The running gear of the table 30 must be controlled to align the vehicle center point P with a point Q which is on an extension of a center line C1 of the table 30.

Well-known methods for calculating the vehicle center point P to align the vehicle center point P with the point Q can be used in this process.

Figure 4:
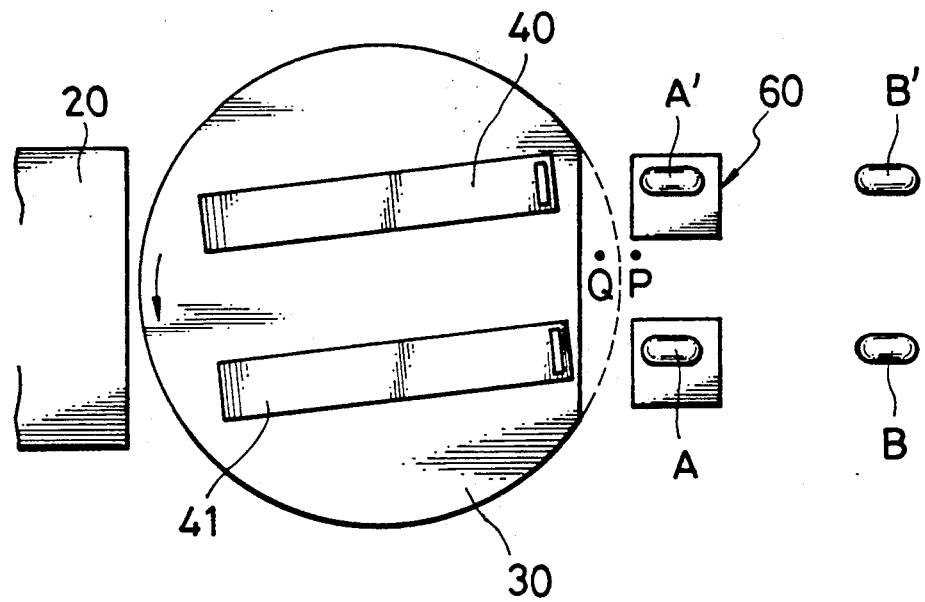
FIG. 4 is a plan view of the turn-table when the front wheels of the vehicle are on the detector.

In operation, the table 30 is first positioned with the center line C1 of the table 30 aligned with the center point of the detector 60 before the front wheels of the car are driven onto the detector 60 and then onto the table 30 (shown in FIG. 4).

Driving the front wheels A and A' of the car directly onto the belts 40 and 41 is difficult but driving the wheels onto the detector 60 is easy, even if the driver has poor driving skill.

Figure 5:
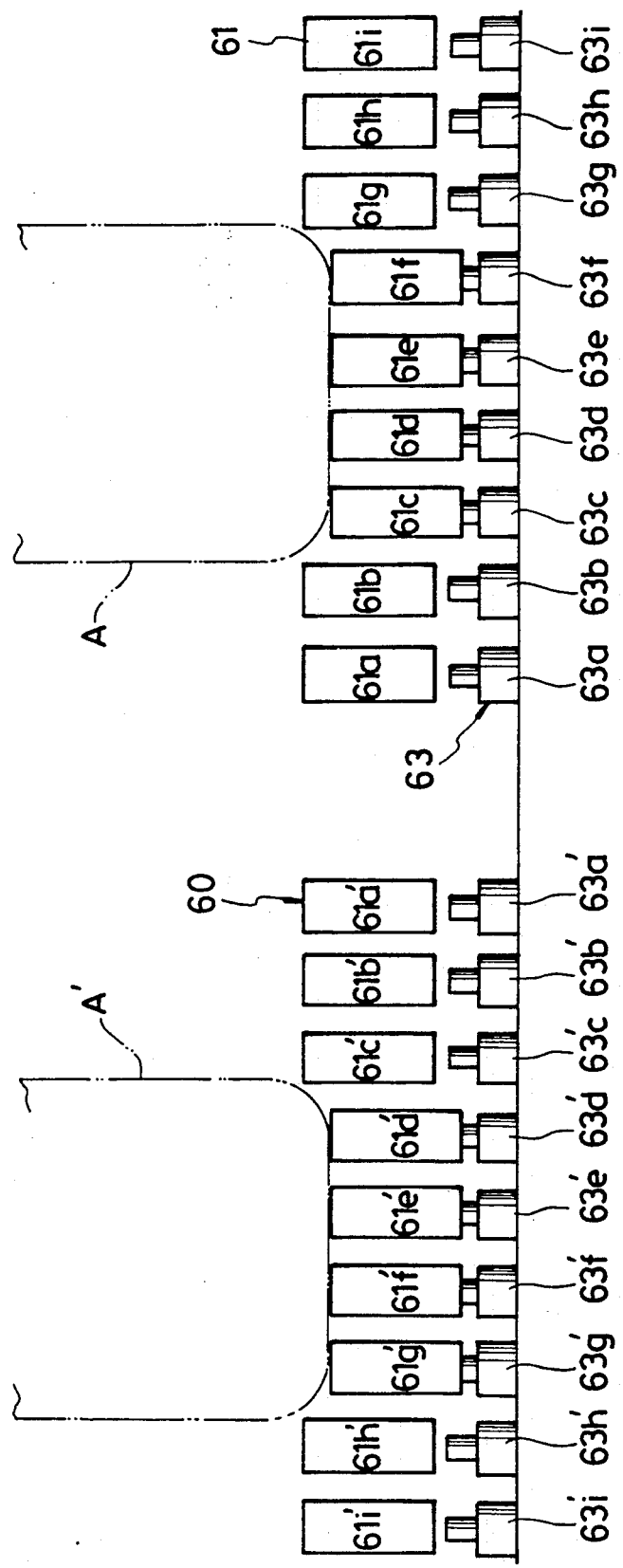
FIG. 5 is a transverse sectional view of the detector shown in FIG. 4.

FIG. 5 shows the detector after the front wheels A and A' of the vehicle have been driven onto some of the foot-boards 61. Thus, the foot-board 61a, 61b, ..., 61a', 61b', ..., are arranged at regular intervals in a row and the limit switches 63a, 63b, ..., 63a', 63b', ..., are arranged under their respective foot-boards.

The nearside of the front wheel A presses the foot-board 61c to 61f and the offside of the front wheel A' presses the foot-boards 61d' to 61g'. The detector 60 calculates the spacing between the front wheels A and A, to calculate the vehicle center point P automatically (shown in FIG. 4). Therefore, the vehicle center point P is calculated from the position of the pressed foot-boards 61.

Figure 6:
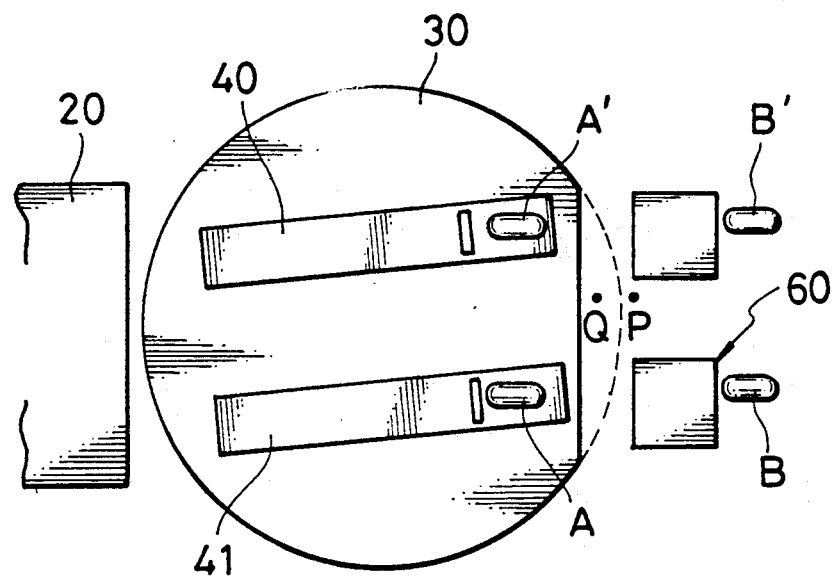
FIG. 6 is a plan view of the turn-table when the front wheels of the vehicle are on the movable belts.

As shown in FIG. 4, the table 30 is then turned, following the arrow direction, to align the center point Q of the table to the vehicle center point P. The table 30 turns in a direction appropriate for the front wheels of the vehicle to be driven centrally onto the belts (FIG. 6). The springy parts 62 then push the pressed foot-boards 61 back up after the front wheels of the vehicle have passed all the foot-boards.

While the front wheels A and A' are on the belts 40 and 41, the rear wheels B and B' are driven onto the detector 60. The front wheels A and A' of the car are stopped on the belts while the vehicle center point P of the rear wheels are calculated through the same process of calculating the center point as stated above. The table 30 turns until the straight line from the center point Q to the vehicle center point P (not shown) is arranged parallel to the foot-boards 61. The rear wheels B and B' of the vehicle are then pulled centrally onto the belts as shown in FIG. 7.

As stated above, the table 30 turns to arrange the position, so that the even a driver with poor driving skill can accurately drive onto the table.

Figure 7:
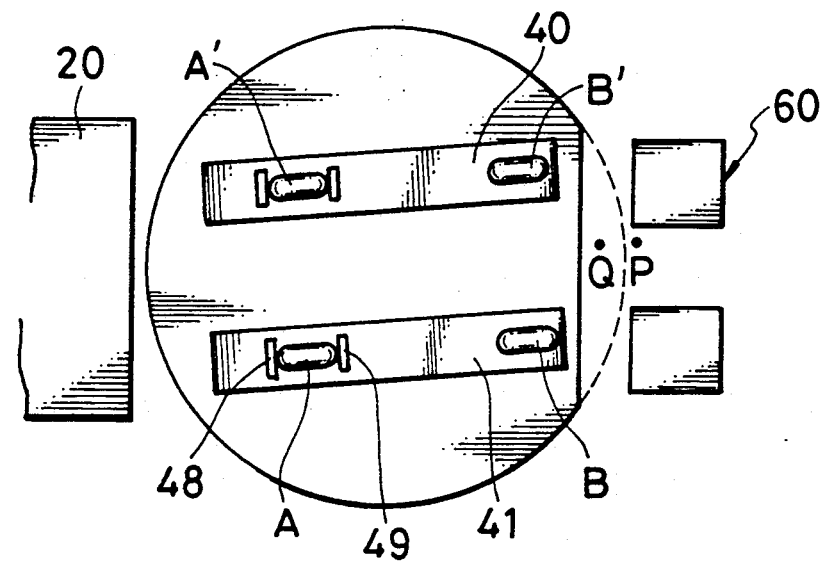
FIG. 7 is a plan view of the turn-table when the rear wheels of the vehicle are on the movable belts.

As shown in FIG. 7, the driver may get out of the vehicle after having driven the vehicle completely onto the table 30 and putting the parking brake on.

Figure 8:
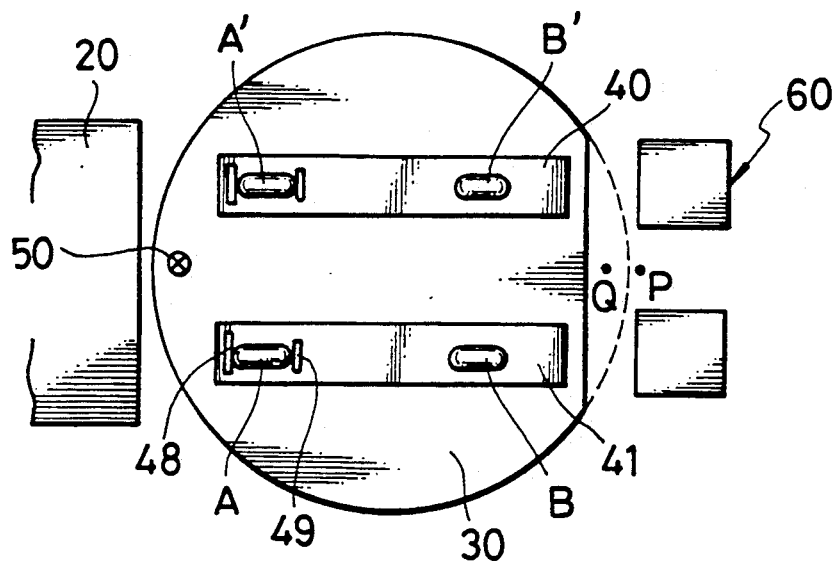
FIG. 8 is a plan view of the turn-table with the vehicle in a stop position on the movable belts.

As shown in FIG. 8, the table 30 turns until the center point Q and the center line 20 of the entrance and exit are in line after the driver has gotten out of the vehicle. Then, the belts 40 and 41 on the table 30 begin to convey the car ahead. Fixing the vehicle, during the turning of the table 30, with stoppers 48 and 49 allows turning in table 30 at velocity. As soon as the bumper (the foremost part) of the vehicle reaches the sensor 50, the sensor 50 reacts and stops the belts 40 and 41 automatically. After this, a conveyer (not shown) or a driver can move the vehicle through the entrance and exit 20.

The illustrated turn-table has the following advantages.

The combination of the table 30 and the detector 60 enables even a driver with poor driving skill to drive the vehicle accurately onto the table because the table turns in a direction appropriate to driving the vehicle centrally onto the table. Furthermore, when the vehicle is driven accurately onto the table, the driver's worry that he might cause an accident, as often occurs in existing turn-tables, is dissipated. In the existing turntables, the vehicle can be driven onto the table from only one entrance. However, with the invention, a vehicle could be driven onto the table from any direction provided that the additional detectors and the sensors are provided as the occasion demands. This invention is not only useful for drive-in multi-story parking garages but also for parking garage planning in which vehicles are automatically parked. The detector which calculates the position of the vehicle is provided in the recess(es) in front of the table, so that the detector provides no obstacle to the vehicle and the driver.

What we claim is:

1. A vehicle turn-table comprising a table which is rotatable in both directions about an upright axis; a pair of driven belts mounted on the table for receiving the wheels of a vehicle; a detector positioned outside the periphery of the table, having foot-boards onto which a pair of transversely spaced vehicle wheels are receivable; means responsive to the detector for calculating a transverse position of the wheels on the detector and hence causing the table to rotate until the pair of wheels and the belts of the table are in alignment; and a sensor mounted on or near the table to determine a stop position of the vehicle when fully positioned on the table.

* * * * *